(12) United States Patent
Shepherd et al.

(10) Patent No.: US 12,236,751 B2
(45) Date of Patent: *Feb. 25, 2025

(54) SYSTEM AND METHOD FOR REDEEMING TICKET VOUCHERS

(71) Applicant: IGT, Las Vegas, NV (US)

(72) Inventors: Jeffery Shepherd, Reno, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 185 days.

This patent is subject to a terminal disclaimer.

(21) Appl. No.: 18/093,244

(22) Filed: Jan. 4, 2023

(65) Prior Publication Data
US 2023/0143948 A1 May 11, 2023

Related U.S. Application Data

(63) Continuation of application No. 17/343,308, filed on Jun. 9, 2021, now Pat. No. 11,551,524, which is a continuation of application No. 16/579,178, filed on Sep. 23, 2019, now Pat. No. 11,069,190.

(51) Int. Cl.
*G07F 17/32* (2006.01)
*G06Q 20/04* (2012.01)
*G06Q 20/34* (2012.01)

(52) U.S. Cl.
CPC ....... *G07F 17/3251* (2013.01); *G06Q 20/045* (2013.01); *G06Q 20/342* (2013.01); *G07F 17/3248* (2013.01); *G07F 17/3255* (2013.01)

(58) Field of Classification Search
CPC ............. G07F 17/3251; G07F 17/3248; G07F 17/3255; G06Q 20/045; G06Q 20/342
USPC .......................................................... 463/25
See application file for complete search history.

(56) References Cited

U.S. PATENT DOCUMENTS

| | | | |
|---|---|---|---|
| 7,828,646 B2 | 11/2010 | Franks, Jr. | |
| 7,976,382 B2 | 7/2011 | Benbrahim | |
| 8,023,715 B2 | 9/2011 | Jones et al. | |
| 8,216,064 B1 | 7/2012 | Muskin | |
| 8,407,141 B2 | 3/2013 | Mullen et al. | |
| 8,556,707 B2 | 10/2013 | Beer et al. | |
| 8,595,137 B2 | 11/2013 | Sears et al. | |
| 8,958,534 B2 | 2/2015 | Bodman | |
| 9,552,573 B2 | 1/2017 | Kulpati et al. | |
| 9,990,801 B2 | 6/2018 | Sanford et al. | |
| 10,402,815 B2 | 9/2019 | Sharma et al. | |
| 2007/0203832 A1 | 8/2007 | Babi et al. | |
| 2009/0239650 A1* | 9/2009 | Alderucci | G06Q 20/207 463/25 |
| 2013/0190073 A1* | 7/2013 | Edmunds | G07F 17/3251 463/25 |
| 2014/0057697 A1* | 2/2014 | Nelson | G07F 17/32 463/20 |
| 2014/0087844 A1* | 3/2014 | Gilliland | G07F 17/3255 463/25 |
| 2017/0213199 A1 | 7/2017 | Schwartz | |
| 2018/0082529 A1 | 3/2018 | Mchugh et al. | |
| 2019/0295369 A1* | 9/2019 | Lutnick | G07F 17/3232 |
| 2020/0111280 A1* | 4/2020 | Cleveland | G07F 17/322 |

(Continued)

*Primary Examiner* — Pierre E Elisca

(74) *Attorney, Agent, or Firm* — Neal, Gerber & Eisenberg LLP

(57) ABSTRACT

A system and method that provide non-cash avenues to redeem a ticket voucher associated with an amount of funds.

20 Claims, 5 Drawing Sheets

(56) References Cited

U.S. PATENT DOCUMENTS

2020/0302740 A1\* 9/2020 Cleveland ........... G07F 17/3227
2020/0302746 A1\* 9/2020 Cleveland ........... G07F 17/3211

\* cited by examiner

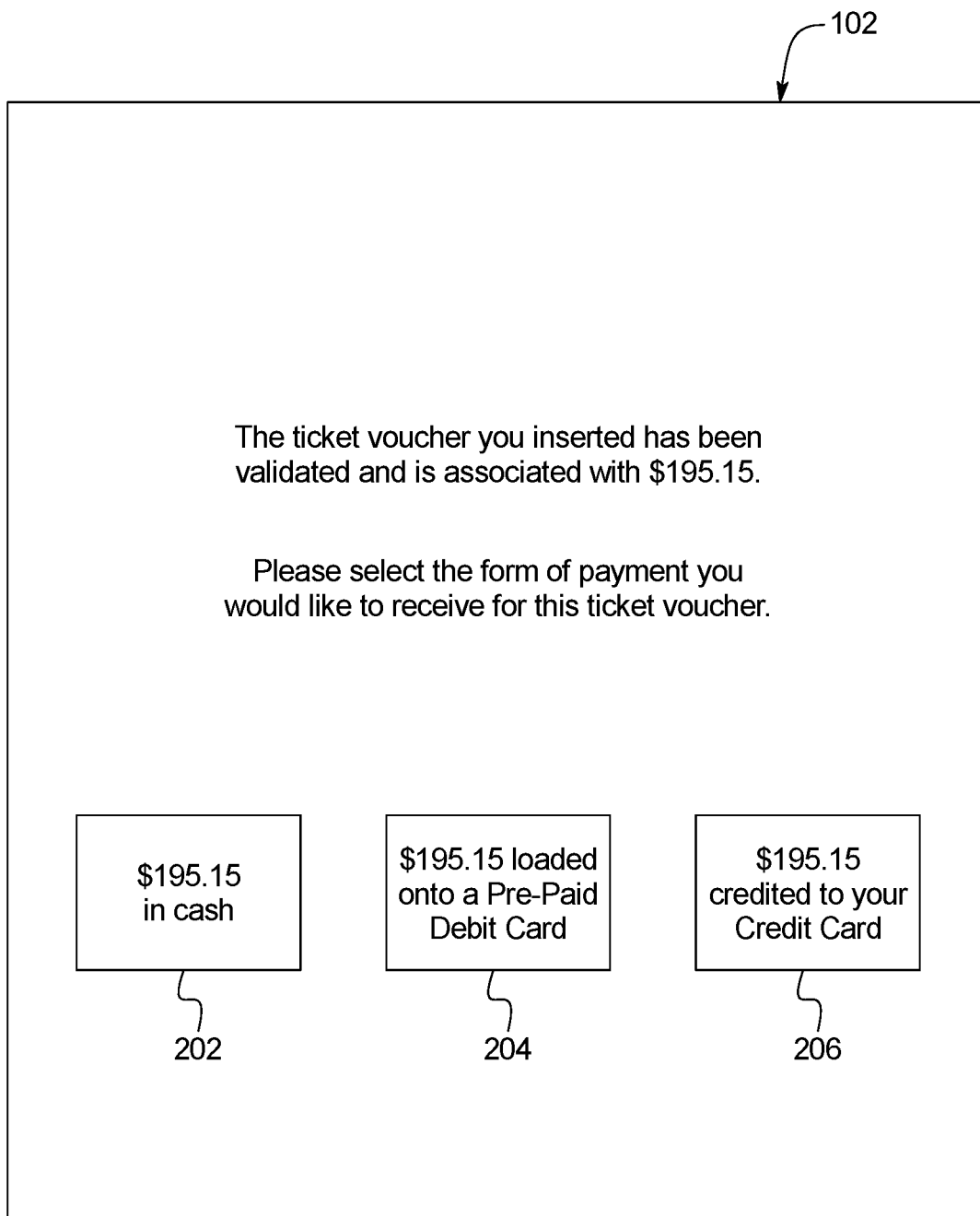

SYSTEM AND METHOD FOR REDEEMING TICKET VOUCHERS

PRIORITY CLAIM

This application is a continuation of, claims the benefit of and priority to U.S. patent application Ser. No. 17/343,308, filed on Jun. 9, 2021, which is a continuation of, claims the benefit of and priority to U.S. patent application Ser. No. 16/579,178, filed on Sep. 23, 2019, the entire contents of which are incorporated herein by reference.

TECHNICAL FIELD

The technical field of the present disclosure is that of systems and methods that enable a user to redeem a ticket voucher associated with an amount of funds for one or more non-cash forms of payment.

BACKGROUND

Gaming machines may provide players awards in primary games. Gaming machines generally require the player to place a wager to activate the primary game. The award may be based on the player obtaining a winning symbol or symbol combination and on the amount of the wager. When a player cashes out a credit balance of such gaming machines, these gaming machines may provide the player with a ticket voucher redeemable for the amount of the credit balance.

BRIEF SUMMARY

In certain embodiments, the present disclosure relates to a system including a processor, and a memory device that stores a plurality of instructions. When executed by the processor, upon an occurrence of a ticket voucher redemption event, the instructions cause the processor to determine a first amount of funds associated with a ticket voucher. When executed by the processor responsive to receipt of data associated with an input of a non-cash redemption of the ticket voucher, the instructions cause the processor to determine, based on the first amount of funds associated with the ticket voucher, a second amount of funds to provide in association with a non-cash form of payment, and cause the second amount of funds to be available in association with the non-cash form of payment.

In certain embodiments, the present disclosure relates to a system including a processor, and a memory device that stores a plurality of instructions. When executed by the processor, upon an occurrence of a ticket voucher redemption event associated with a ticket voucher and responsive to a determination of an identity of a user associated with the ticket voucher, the instructions cause the processor to determine if the identified user qualifies to redeem the ticket voucher for a non-cash form of payment, wherein the determination is based on historical ticket voucher redemption activity of the identified user. When executed by the processor responsive to the determination being that the identified user qualifies to redeem the ticket voucher for the non-cash form of payment, the instructions cause the processor to determine a first amount of funds to provide in association with a non-cash form of payment. When executed by the processor responsive to the determination being that the identified user fails to qualify to redeem the ticket voucher for the non-cash form of payment, the instructions cause the processor to determine a second amount of funds to provide in association with a cash payment.

In certain embodiments, the present disclosure relates to a method of operating a system including, upon an occurrence of a ticket voucher redemption event, determining, by a processor, a first amount of funds associated with a ticket voucher. Responsive to receipt of an input associated with a non-cash redemption of the ticket voucher, the method includes determining, by the processor and based on the first amount of funds associated with the ticket voucher, a second amount of funds to provide in association with a non-cash form of payment, and causing the second amount of funds to be available in association with the non-cash form of payment.

Additional features are described herein, and will be apparent from the following Detailed Description and the figures.

BRIEF DESCRIPTION OF SEVERAL VIEWS OF THE DRAWINGS

FIGS. 2A, 2B, and 2C are example graphical user interfaces displayed by a ticket voucher redemption kiosk in connection with redeeming a ticket voucher in association with a non-cash form of payment.

DETAILED DESCRIPTION

Figure 1A:
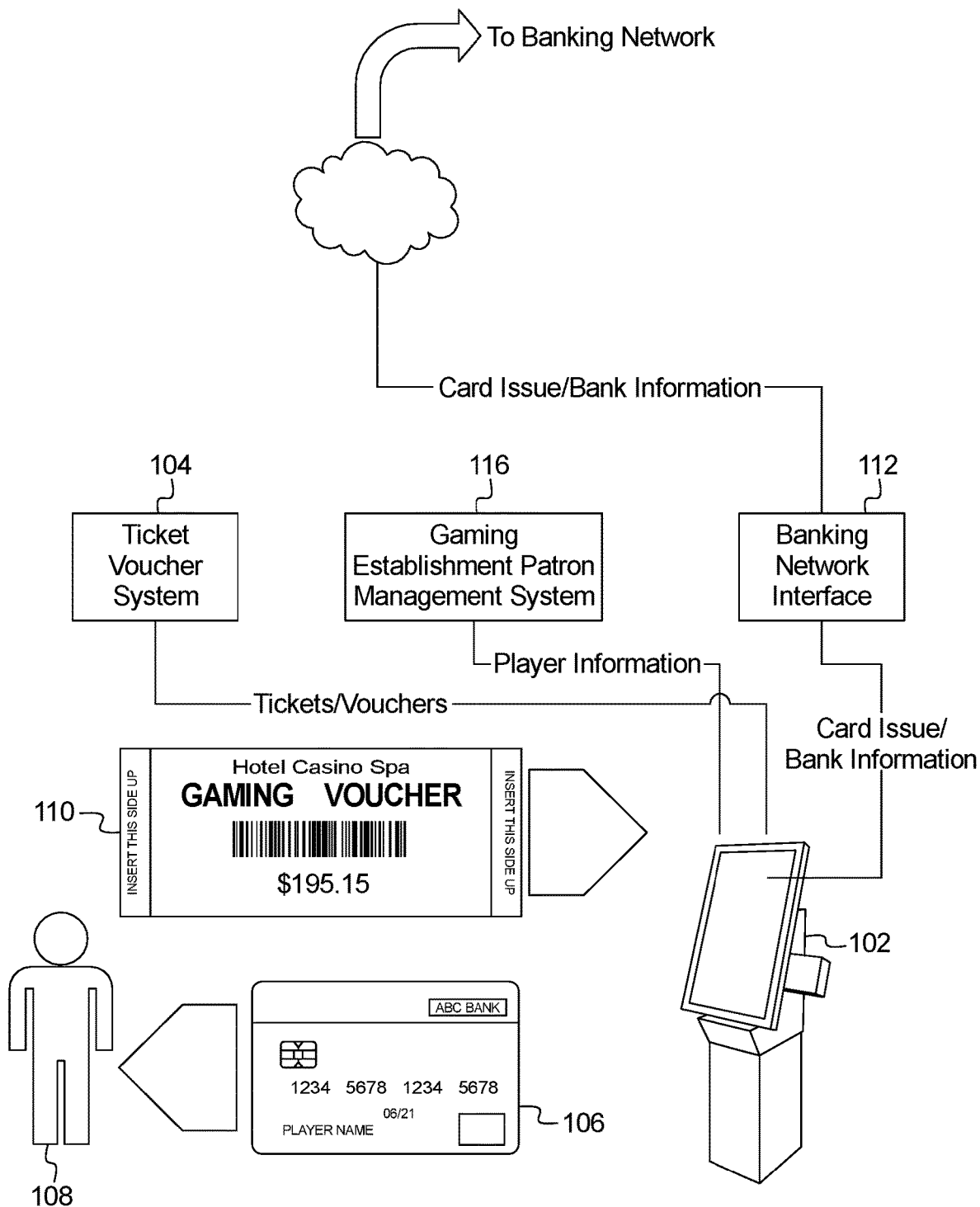
FIG. 1A is a schematic diagram of the interactions between a ticket voucher system, a gaming establishment patron management system and a banking network interface in association with converting a ticket voucher to a pre-paid debit card.

In various embodiments, the systems and methods disclosed herein provide non-cash avenues to redeem a ticket voucher associated with an amount of funds.

In certain embodiments, following a user procuring a ticket voucher (e.g., an anonymous bearer instrument redeemable for cash via a ticket voucher redemption kiosk and/or game play on a gaming establishment device such as an electronic gaming machine ("EGM")), the system enables the user to redeem the ticket voucher for a non-cash form of payment. That is, in view of the various security concerns (e.g., protecting gaming establishment cash and protecting gaming establishment patrons carrying cash) and labor concerns (e.g., servicing ticket voucher redemption kiosks which dispense cash in exchange for ticket vouchers) associated with cash-based transactions, the system disclosed herein provides an alternative, non-cash-based option for a gaming establishment patron to redeem a ticket voucher while complying with various anti-money laundering regulations which require the tracking of certain financial transactions associated with a gaming establishment patron. As such, to further expand the cashless ecosystem certain gaming establishments strive for, the system disclosed herein enables a user the opportunity to exchange a ticket voucher, in paper form or virtual form, for an amount of funds that are independent of any amount of cash and relatively more secure than an amount of cash.

In certain embodiments, the non-cash form of payment that the system utilizes in association with the redemption of ticket vouchers includes pre-paid cards, such as a pre-paid debit card associated with a balance or a card associated with a pre-paid access account which, per current regulations from the U.S. Treasury Department Financial Crimes Enforcement Network ("FinCEN"), cannot be convertible to cash and can only be used for the purchase of goods and/or services. In these embodiments, the system enables the user to redeem the ticket voucher for a pre-paid card associated with the amount of funds of the redeemed ticket voucher after accounting for any imposed fees. That is, rather than redeeming a ticket voucher at a ticket voucher redemption kiosk or gaming establishment interface, such as a casino desk, for an amount of cash equal to an amount of funds associated with the redeemed ticket voucher, the system enables a user to redeem a ticket voucher, in paper form or virtual form, at a ticket voucher redemption kiosk, a gaming establishment interface or a mobile device running an application associated with the gaming system, for, subject to any assessed fees, a pre-paid card loaded with an amount of funds associated with the redeemed ticket voucher. Such a configuration frees the user up from having to carry such an amount of cash on their person (and thus diminishes the risks that such cash may be lost or stolen).

In certain embodiments, the non-cash form of payment that the system utilizes in association with the redemption of ticket vouchers includes the system creating an original credit transaction, such as a transfer of funds to a credit card account which is independent of a refunding of an amount of a purchase that was originally charged to the credit card account. In these embodiments, following a user procuring a ticket voucher, the system enables the user to redeem the ticket voucher in exchange for the system facilitating an original credit transaction (e.g., a Visa Direct™ transaction) for an amount of funds of the redeemed ticket voucher after accounting for any imposed fees. In other words, rather than redeeming a ticket voucher at a ticket voucher redemption kiosk or gaming establishment interface, such as a casino desk, for an amount of cash equal to an amount of funds associated with the redeemed ticket voucher, the system enables a user to utilize one or more devices, such as an EGM, a ticket voucher redemption kiosk, a gaming establishment interface or a mobile device running an application associated with the gaming system, to redeem a ticket voucher, in paper form or virtual form, for, subject to any assessed fees, the creation of an original credit transaction in an amount of funds associated with the redeemed ticket voucher. Such a configuration also frees the user up from having to carry such an amount of cash on their person (and thus diminishes the risks that such cash may be lost or stolen).

It should be appreciated that in addition to potentially providing a relatively more secure environment for a user (via reducing or eliminating the need for the user to carry cash), the system disclosed herein further benefits the gaming establishment by freeing the gaming establishment up from also having to carry relatively large amounts of cash in ticket voucher redemption devices. That is, by reducing the use of such ticket voucher redemption devices, the system reduces the wear and tear on such devices thus prolonging the operational life on these ticket voucher redemption devices. Moreover, by reducing the amount of cash transactions in a gaming establishment via utilizing the automated issuance of pre-paid cards and/or the creation of original credit transactions, the system disclosed herein reduces or eliminates human errors which often occur when ticket vouchers are redeemed at gaming establishment interfaces, such as casino desks. In other words, eliminating gaming establishment personnel from issuing amounts of cash in exchange for redeemed ticket vouchers not only protects the user (if the gaming establishment personnel provides the user less cash than the user deserves for the redeemed ticket voucher) but also protects the gaming establishment (if the gaming establishment personnel inadvertently or fraudulently provides the user more cash than the user deserves for the redeemed ticket voucher).

Redeeming Ticket Vouchers

In various embodiments, following a user obtaining one or more ticket vouchers, such as upon a user of an EGM cashing out a credit balance in exchange for a ticket voucher associated with an amount of funds of the cashed out credit balance, the system enables a user to redeem such ticket vouchers in exchange for a non-cash form of payment.

Figure 1B:
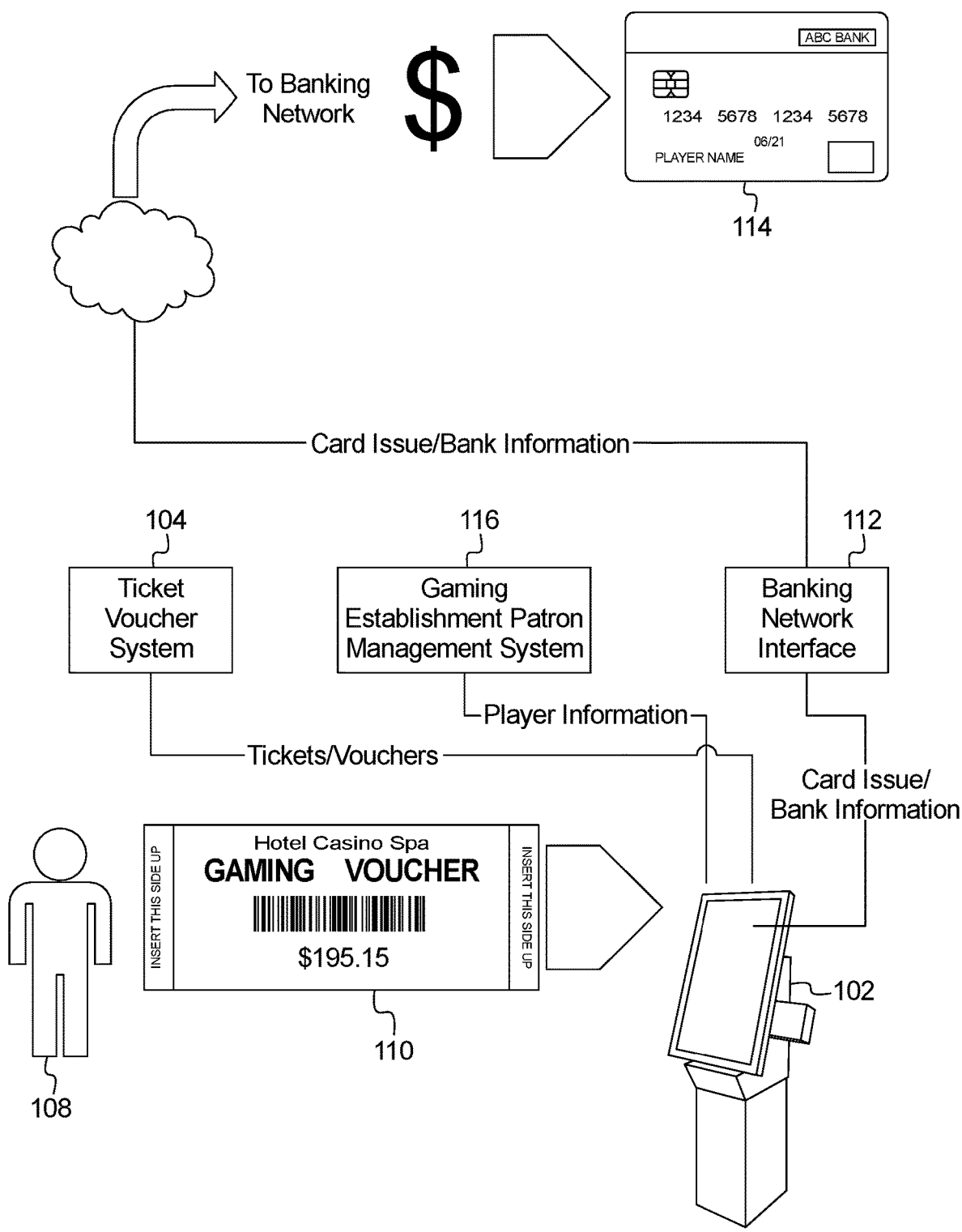
FIG. 1B is a schematic diagram of the interactions between a ticket voucher system, a gaming establishment patron management system and a banking network interface in association with converting a ticket voucher to an original credit transaction.

In one embodiment wherein the ticket voucher takes the form of a paper ticket voucher, the user provides the paper ticket voucher to a ticket voucher redemption kiosk. In this embodiment, upon receiving the paper ticket voucher, the ticket voucher redemption kiosk (or a component of a gaming establishment management system located inside the ticket voucher redemption kiosk (i.e., a component of the ticket voucher redemption kiosk)) scans the paper ticket voucher to obtain identifying information associated with the presented paper ticket voucher. The ticket voucher redemption kiosk (or a component of a gaming establishment management system located inside the ticket voucher redemption kiosk) then operates with the ticket voucher system to determine whether to authorize the redemption of the paper ticket voucher. That is, as seen in FIGS. 1A and 1B, the ticket voucher redemption kiosk 102 operates with the ticket voucher system 104 to determine whether the paper ticket voucher is an authentic paper ticket voucher currently associated with the amount of funds indicated by the presented paper ticket voucher. In other words, the system verifies that the presented paper ticket voucher is a valid ticket voucher which is authentic and has not been previously redeemed and/or voided by the ticket voucher system.

In another embodiment wherein the ticket voucher takes the form of a paper ticket voucher, the user utilizes a mobile device application being run on a mobile device to scan the paper ticket voucher, wherein information regarding the scanned paper ticket voucher is communicated from the mobile device to a ticket voucher redemption kiosk (as described herein). In this embodiment, upon receiving the information regarding the scanned paper ticket voucher from the mobile device, the ticket voucher redemption kiosk (or a component of a gaming establishment management system located inside the ticket voucher redemption kiosk (i.e., a component of the ticket voucher redemption kiosk)) operates with the ticket voucher system to determine whether to authorize the redemption of the paper ticket voucher by verifying that the paper ticket voucher is a valid ticket voucher which is authentic and has not been previously redeemed and/or voided by the ticket voucher system.

In one embodiment wherein the ticket voucher takes the form of a virtual ticket voucher, to redeem the virtual ticket voucher, the user presents a wallet identity (i.e., a physical card associated with a gaming establishment account associated with a virtual ticket voucher or a mobile device running a mobile device application associated with a gaming establishment account associated with a virtual ticket voucher or a mobile device running a mobile device application associated with a virtual ticket voucher independent of any gaming establishment account) to the ticket voucher redemption kiosk. In this embodiment, upon launching the application on the mobile device and following the user selecting a virtual ticket voucher to redeem, the mobile device application prompts the user to cause the mobile device to engage the ticket voucher redemption kiosk, such as prompting the user to tap the mobile device to a designated portion of the ticket voucher redemption kiosk (or otherwise moving the mobile device to within a designated distance of a designated location of the ticket voucher redemption kiosk) to initiate the redemption of the selected virtual ticket voucher. In this embodiment, the ticket voucher redemption kiosk (or a component of a gaming establishment management system located inside the ticket voucher redemption kiosk) operates with the ticket voucher system to determine whether to authorize the redemption of the virtual ticket voucher. That is, the ticket voucher redemption system operates with the ticket voucher system to determine whether the virtual ticket voucher is an authentic virtual ticket voucher by verifying that the virtual ticket voucher to be redeemed is a valid ticket voucher which is authentic and has not been previously redeemed and/or voided by the ticket voucher system.

In these embodiments, regardless of the form of the ticket voucher to be redeemed, if the system determines not to authorize the redemption of the ticket voucher because the ticket voucher is inauthentic or otherwise invalid, such as being previously redeemed or voided by the ticket voucher system, the system communicates a denial to the ticket voucher redemption kiosk and does not complete the ticket voucher redemption. In certain embodiments, the system conveys one or more messages to the user regarding the denial of the ticket voucher redemption, such as via a display device of the ticket voucher redemption kiosk.

On the other hand, if the system determines to authorize the redemption of the ticket voucher because the ticket voucher is valid and authentic, the system notifies the ticket voucher redemption kiosk of the approved redemption and informs the ticket voucher redemption kiosk to enable the user to select a cash form of payment or a non-cash form of payment for the amount of funds associated with the redeemed ticket voucher. For example, as seen in FIG. 2A, following the ticket voucher redemption kiosk 102 receiving a ticket voucher associated with a value of $195.15, the ticket voucher redemption kiosk enables the user to select to receive $195.15 in cash 202, $195.15 in the form of a pre-paid debit card 204, or $195.15 in the form of an original credit transaction 206.

In certain embodiments, the non-cash form of payment includes a pre-paid debit card which can be used in association with a financial network, such as a credit card network, to enable the cardholder to spend money which has been associated with the pre-paid debit card via a prior deposit of funds in association with the redemption of a ticket voucher. In certain such embodiments, the pre-paid debit card is a reloadable debit card wherein the user or another entity may add additional funds to the pre-paid debit card. In other such embodiments, the pre-paid debit card is a non-reloadable debit card wherein neither the user or another entity may add any additional funds to the pre-paid debit card. In certain such embodiments, the amounts of funds associated with a pre-paid debit card may be utilized to purchase goods and/or services, but may not be convertible for cash. In other such embodiments, the amounts of funds associated with a pre-paid debit card may be utilized to purchase goods and/or services and also convertible for cash, such as via an automated teller machine. In this embodiment, to comply with certain anti-money laundering regulations, prior to enabling a user to convert an amount of funds associated with a redeemed ticket voucher to a pre-paid debit card usable at an automated teller machine, the ticket voucher redemption kiosk must first obtain an identity of the user.

In certain embodiments, the non-cash form of payment additionally or alternatively includes a pre-paid gift card which is associated with one or more merchants. In these embodiments, per current U.S. Treasury Department regulations, the funds associated with such a pre-paid gift card, such as a pre-paid merchant card, may not be convertible for cash, but may be used to pay for various purchases of goods and/or services at the associated merchant. In certain embodiments, the pre-paid gift card is reloadable wherein the user or another entity may add additional funds to the pre-paid gift card. In other embodiments, the pre-paid gift card is not reloadable wherein neither the user or another entity may add any additional funds to the pre-paid gift card.

In certain embodiments, the pre-paid debit card and/or the pre-paid gift card include physical cards including one or more embedded microchips and/or magnetic stripes that store information regarding the pre-paid debit card and/or the pre-paid gift card. In certain embodiments, the pre-paid debit card and/or the pre-paid gift card additionally or alternatively include virtual cards, wherein a user is provided login information to access a website which displays the electronic pre-paid debit card number and/or the electronic pre-paid gift card number. In certain embodiments, the pre-paid debit card and/or the pre-paid gift card additionally or alternatively include virtual cards, wherein a user accesses the pre-paid debit card and/or the pre-paid gift card via an electronic wallet, such as an electronic wallet associated with a mobile device, which then stores information regarding the pre-paid debit card and/or the pre-paid gift card.

In certain embodiments, the non-cash form of payment additionally or alternatively includes an original credit transaction wherein an amount of funds associated with the redeemed ticket voucher are credited to an account of the user, such as a credit card account or a debit card account. That is, unlike a refund transaction which enables a merchant to return an amount of funds previously withdrawn from a credit card account and/or a debit card account of a user back to the account of the user which the funds were initially drawn from, an original credit transaction enables the transfer of an amount of funds to a credit card account of the user and/or a debit card account of the user regardless of any original transaction. Put differently, an original credit transaction enables an amount of funds to be transferred directly to a credit card account and/or a debit card account independent of any prior transaction which charged an amount of funds from that account.

If the user selects the cash form of payment for the amount of funds associated with the redeemed ticket voucher, then the ticket voucher redemption kiosk issues an amount of cash to the user equal to the amount of funds associated with the redeemed ticket voucher. In association with the redemption of the ticket voucher for an amount of cash, the ticket voucher redemption kiosk communicates data associated with such a redemption to the ticket voucher system which updates one or more databases to account for the redemption of the ticket voucher. That is, the ticket voucher redemption kiosk sends data associated with the redeemed ticket voucher to a server of the ticket voucher system to record the transaction of the redemption of the ticket voucher.

On the other hand, if the user selects the non-cash form of payment for the amount of funds associated with the redeemed ticket voucher, then the system communicates with one or more servers of an external network, such as a server of a banking network, to provide the non-cash form of payment to the user. That is, rather than providing the user an amount of cash for a redeemed ticket voucher, the system enables the user to convert the amount of funds associated with a redeemed ticket voucher to a non-cash form of payment which certain users and certain gaming establishments find preferable.

Figure 2B:
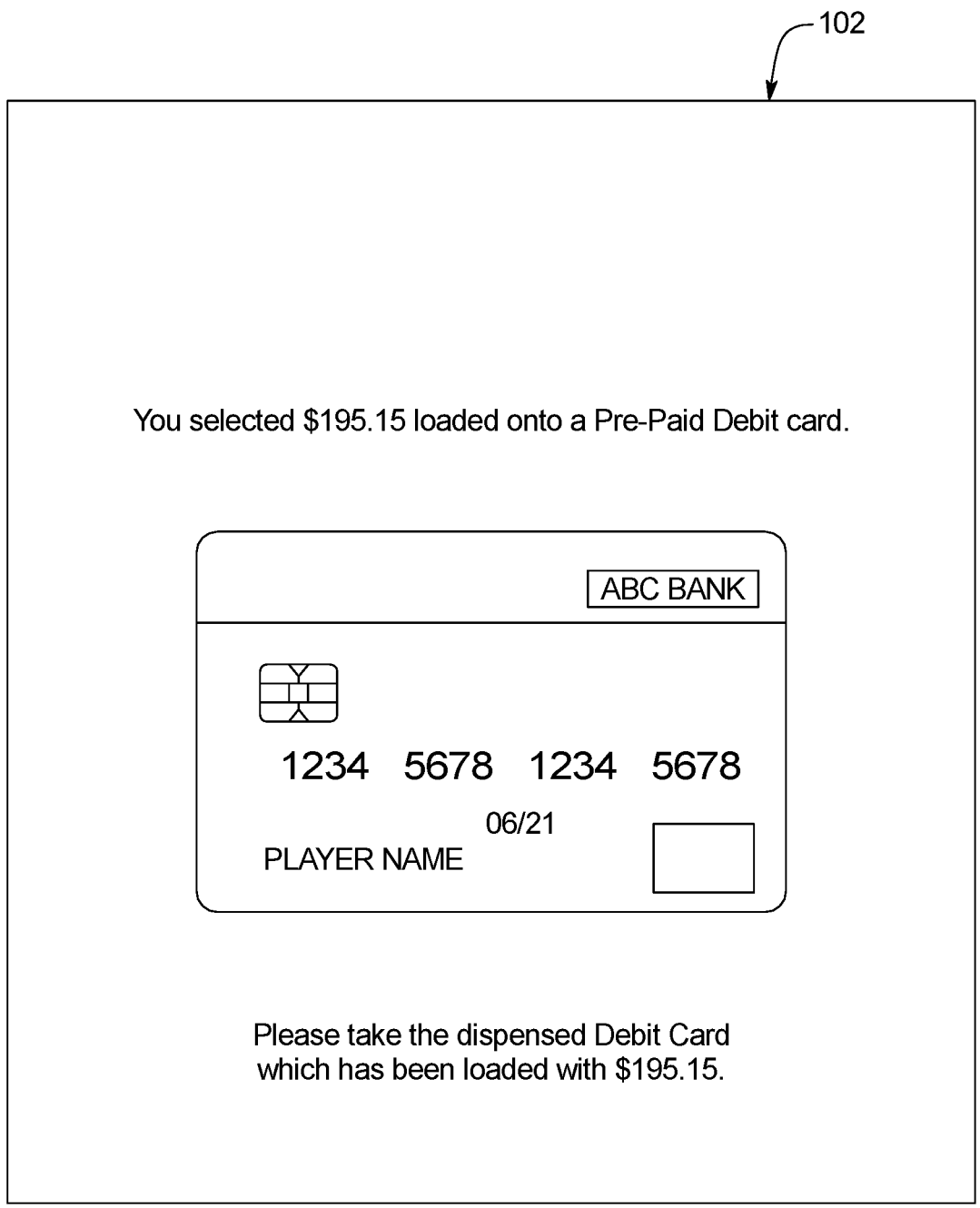

In certain embodiments wherein the non-cash form of payment includes a pre-paid debit card, upon the user selecting to redeem a ticket voucher for a pre-paid debit card, the ticket voucher redemption kiosk issues to the user a pre-paid debit card having an amount of funds equal to, minus any processing fees, the amount of funds associated with the redeemed ticket voucher. For example, as seen in FIG. 2B, upon the user selecting to obtain $195.15 in the form of a pre-paid debit card, the ticket voucher redemption kiosk issues to the user a pre-paid debit card funded with $195.15 (not shown) and informs the user to take the pre-paid debit card dispensed by the ticket voucher redemption kiosk. In another embodiment wherein the non-cash form of payment includes a pre-paid debit card, upon the user selecting to redeem a ticket voucher for a pre-paid debit card, the ticket voucher redemption kiosk enables the user to insert a previously issued pre-paid debit card wherein upon receipt of that pre-paid debit card, the ticket voucher redemption kiosk funds that pre-paid debit card with an amount of funds equal to, minus any processing fees, the amount of funds associated with the redeemed ticket voucher. In one such embodiment, in recognition of the lower administrative costs associated with reusing pre-paid debit cards, the system imposes less processing fees for converting an amount of funds associated with a redeemed ticket voucher to a previously issued pre-paid debit card than a newly issued pre-paid debit card.

In these embodiments, to either issue a pre-paid debit card or add an amount of funds to a previously issued pre-paid debit card, the ticket voucher redemption kiosk communicates with one or more servers of a banking network (or one or more intermediate servers which then communicate with one or more servers of the banking network) to fund a pre-paid debit card with part or all of the amount of funds associated with the redeemed ticket voucher. In these embodiments, since the redeemed ticket voucher is a bearer instrument, in redeeming a ticket voucher for a pre-paid debit card, the system initiates a fund transfer wherein an amount of funds corresponding to part or all of the amount of the redeemed ticket voucher is transferred from a gaming establishment account which holds the funds associated with the ticket voucher system, such as a banking account associated with the gaming establishment, to an account of a financial institution which maintains the pre-paid debit card, such as a banking account associated with a bank that issues the pre-paid debit card. That is, the ticket voucher redemption kiosk is in communication with a pre-paid card system, such as a financial institution including one or more servers which store, in one or more databases, pre-paid card identification information associated with each created pre-paid card, such as identifying information, value information, and/or activity information. For example, as seen in FIG. 1A, in issuing a pre-paid debit card 106 to a user 108 redeeming a ticket voucher 110, the ticket voucher redemption kiosk 102 operates with a banking network interface 112 to fund a pre-paid debit card 106 associated with the redeemed ticket voucher 110. In these embodiments, in addition to communicating data with a server of a banking network to fund a pre-paid debit card, in association with the redemption of a ticket voucher for a pre-paid debit card, the ticket voucher redemption kiosk communicates data associated with such a redemption to the ticket voucher system which records the transaction of the redemption of the ticket voucher (e.g., reduces the amount of funds associated with the identification number of the redeemed ticket voucher to account for the pre-paid debit card and any incurred fees) and updates one or more databases to account for the redemption of the ticket voucher.

In certain embodiments wherein the non-cash form of payment includes a pre-paid gift card, upon the user selecting to redeem a ticket voucher for a pre-paid gift card, the ticket voucher redemption kiosk issues to the user a pre-paid gift card having an amount of funds equal to, minus any processing fees, the amount of funds associated with the redeemed ticket voucher. In another embodiment wherein the non-cash form of payment includes a pre-paid gift card, upon the user selecting to redeem a ticket voucher for a pre-paid gift card, the ticket voucher redemption kiosk enables the user to insert a previously issued pre-paid gift card wherein upon receipt of that pre-paid gift card, the ticket voucher redemption kiosk funds that pre-paid gift card with an amount of funds equal to, minus any processing fees, the amount of funds associated with the redeemed ticket voucher.

In these embodiments, to either issue a pre-paid gift card or add an amount of funds to a previously issued pre-paid gift card, the ticket voucher redemption kiosk communicates with one or more servers of a merchant and/or a banking network (or one or more intermediate servers which then communicate with one or more servers of the merchant and/or the banking network) to fund a pre-paid gift card with part or all of the amount of funds associated with the redeemed ticket voucher. In these embodiments, since the redeemed ticket voucher is a bearer instrument, in redeeming a ticket voucher for a pre-paid gift card, the system initiates a fund transfer wherein an amount of funds corresponding to part or all of the amount of the redeemed ticket voucher is transferred from a gaming establishment account which holds the funds associated with the ticket voucher system, such as a banking account associated with the gaming establishment, to an account of a merchant which issues the pre-paid gift card, such as a banking account associated with a retailer that issues the pre-paid gift card. In these embodiments, in addition to communicating data with a server of a banking network to obtain a pre-paid gift card, in association with the redemption of a ticket voucher for a pre-paid gift card, the ticket voucher redemption kiosk communicates data associated with such a redemption to the ticket voucher system which records the transaction of the redemption of the ticket voucher (e.g., reduces the amount of funds associated with the identification number of the redeemed ticket voucher to account for the pre-paid gift card and any incurred fees) and updates one or more databases to account for the redemption of the ticket voucher.

Figure 2C:
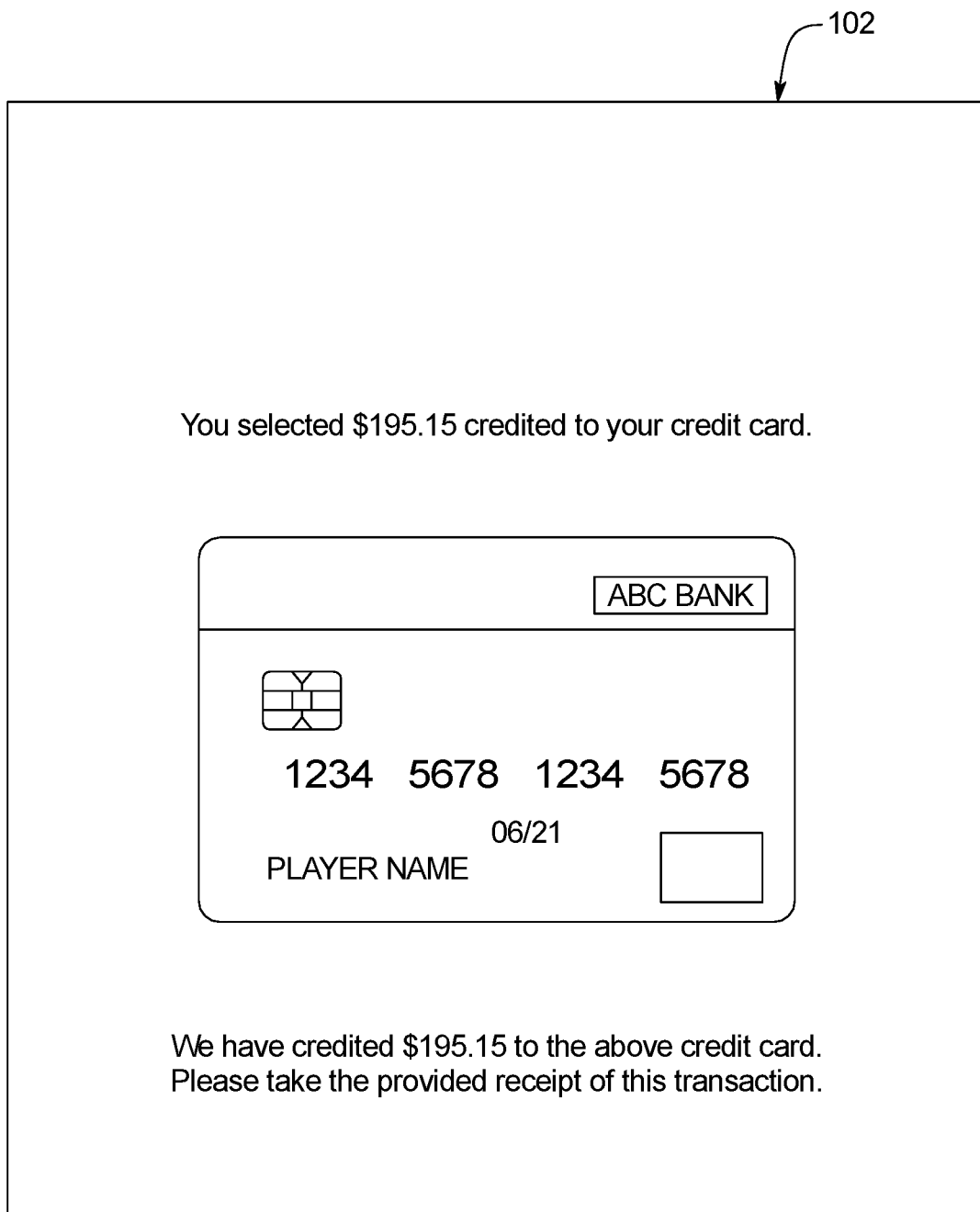

In certain embodiments wherein the non-cash form of payment includes an original credit transaction, upon the user selecting to redeem a ticket voucher for an original credit transaction, the ticket voucher redemption kiosk enables the user to insert or swipe a credit card or a debit card (or transfer data associated with such a credit card or a debit card from a mobile device application of a mobile device in communication with the ticket voucher redemption kiosk), wherein upon reading data from the credit card or the debit card, the ticket voucher redemption kiosk transfers an amount of funds equal to, minus any processing fees, the amount of funds associated with the redeemed ticket voucher to the account associated with the received credit card or the received debit card. For example, as seen in FIG. 2C, upon the user selecting to obtain $195.15 in the form of an original credit transaction and following the user providing information regarding their credit card, the ticket voucher redemption kiosk creates an original credit transaction by funding the user's credit card with $195.15 (not shown) and informs the user to take the receipt memorializing the crediting of the user's provided credit card with the $195.15 from the redeemed ticket voucher.

In these embodiments, to create an original credit transaction, the ticket voucher redemption kiosk communicates with one or more servers of a banking network (or one or more intermediate servers which then communicate with one or more servers of the banking network) to create an original credit transaction with part or all of the amount of funds associated with the redeemed ticket voucher. In these embodiments, since the redeemed ticket voucher is a bearer instrument, in redeeming a ticket voucher for an original credit transaction, the system initiates a fund transfer wherein an amount of funds corresponding to part or all of the amount of the redeemed ticket voucher is transferred from a gaming establishment account which holds the funds associated with the ticket voucher system, such as a banking account associated with the gaming establishment, to the credit card account associated with the credit card of the user and/or the banking account associated with the debit card of the user. For example, as seen in FIG. 1B, in creating an original credit transaction for a user 108 redeeming a ticket voucher 110, the ticket voucher redemption kiosk 102 operates with a banking network interface 112 to create an original credit transaction which funds the account associated with the credit card or debit card 114 of the user. In these embodiments, in addition to communicating data with a server of a banking network to create an original credit transaction, in association with the redemption of a ticket voucher, the ticket voucher redemption kiosk communicates data associated with such a redemption to the ticket voucher system which records the transaction of the redemption of the ticket voucher (e.g., reduces the amount of funds associated with the identification number of the redeemed ticket voucher to account for the created original credit transaction and any incurred fees) and updates one or more databases to account for the redemption of the ticket voucher.

In certain embodiments, the ticket voucher redemption kiosk enables a user to select a non-cash form of payment for the entire amount of funds associated with the redeemed ticket voucher. In certain embodiments, the ticket voucher redemption kiosk enables a user to select a non-cash form of payment for a portion of the amount of funds associated with the redeemed ticket voucher. In these embodiments, the ticket voucher redemption kiosk enables a user to split the amount of funds associated with the redeemed ticket voucher into one or more forms of payment, such as between a pre-paid debit card, a pre-paid gift card, an original credit transaction, an amount of cash and/or a transfer of an amount of funds to a financial account associated with the user that is maintained by a financial institution. For example, if a user has a ticket voucher associated with $1000 and the user redeems that ticket voucher at a ticket voucher redemption kiosk, the ticket voucher redemption kiosk enables the user to select to split the amount of funds to $100 in cash (dispensed by the ticket voucher redemption kiosk) and $900 transferred to a bank account associated with the user.

In certain embodiments, to facilitate the conversion of a redeemed ticket voucher to a non-cash form of payment, as indicated above, the system imposes certain fees associated with such a conversion. Certain of these transaction fees are imposed by the financial institution which is issuing the pre-paid card or creating the original credit transaction. In one such embodiment, different financial institutions may impose different fees for different types of non-cash forms of payment (e.g., a conversion of a redeemed ticket voucher to a pre-paid debit card carries a 2% fee imposed on the amount of the ticket voucher while a conversion of a redeemed ticket voucher to a creation of an original credit transaction carries a 1% fee imposed on the amount of the ticket voucher). In another such embodiment, different financial institutions may additionally or alternatively impose different fees for different amounts of funds being transferred to these non-cash forms of payment (e.g., a conversion of a redeemed ticket voucher to a pre-paid debit card having a value of under $500 carries a 2% fee imposed on the amount of the ticket voucher while a conversion of a redeemed ticket voucher to a pre-paid debit card having a value of $500 and greater carries a 1% fee imposed on the amount of the ticket voucher).

In certain embodiments, the amount of such fees are taken from the amount of funds associated with the redeemed ticket voucher. In certain embodiments, the user separately pays such fees using playing tracking points, comps, currency, funds associated with one or more gaming establishment accounts maintained for the user, and/or promotional points. In certain embodiments, to encourage the use of this alternative form of ticket voucher redemption (and thus realize the various above-described benefits to the user and gaming establishment), the gaming establishment pays for such fees on the user's behalf In these embodiments, the gaming establishment may pay the fees for certain users (e.g., identified users having a relatively high player tracking status) while not pay the fees for other users (e.g., unidentified users). In certain other embodiments, to facilitate the conversion of a redeemed ticket voucher to a non-cash form of payment, the system does not impose any fees associated with such a conversion. In certain other embodiments, to encourage the use of this alternative form of ticket voucher redemption (and thus realize the various above-described benefits to the user and gaming establishment), the gaming establishment enables a user to convert a first amount of funds associated with a redeemed ticket voucher to a non-cash form of payment associated with a second, greater amount of funds.

In certain embodiments, in association with redeeming a ticket voucher for a non-cash form of payment, the ticket voucher redemption kiosk communicates with one or more servers of a gaming establishment patron management system, such as a player tracking system (or one or more intermediate servers which then communicate with one or more servers of the gaming establishment patron management system) to attempt to identify the user redeeming the ticket voucher. In certain such embodiments, to comply with one or more financial reporting requirements of the banking network that is facilitating the non-cash form of payment, prior to enabling a user to redeem one or more ticket vouchers for a non-cash form of payment, the system requires an identification of the user. For example, as seen in FIGS. 1A and 1B, in issuing a pre-paid debit card 106 to a user redeeming a ticket voucher 110 (as seen in FIG. 1A) and/or in creating an original credit transaction for a user redeeming a ticket voucher 110 (as seen in FIG. 1B), the ticket voucher redemption kiosk 102 operates with a gaming establishment patron management system 116 to obtain information, if applicable, regarding an identity of the user redeeming the ticket voucher. It should be appreciated that in certain other embodiments wherein the user is redeeming a virtual ticket voucher for a non-cash form of payment, in association with communicating data associated with the redeemed virtual ticket voucher to the ticket voucher redemption kiosk, the mobile device application of the mobile device (which is accessing the virtual ticket voucher) also communicates identifying data associated with the user to the ticket voucher redemption kiosk.

In certain embodiments, in view of various anti-money laundering regulations, the ticket voucher redemption kiosk imposes certain limits on the amount of funds which can be converted to non-cash forms of payment over a designated period of time, such as over a day, a week or a month. In these embodiments, for each identified user, the system maintains a database of ticket vouchers redeemed for non-cash forms of payment such that the system may determine, based on any limits imposed for that user, whether or not to authorize the conversion of a ticket voucher to a non-cash form of payment. That is, prior to authorizing the redemption of a ticket voucher to a non-cash form of payment for an identified user, the system determines if that user is below the limit imposed by the system on that user for the designated period of time. If the system determines that the user has exceeded the limit imposed by the system on that user for the designated period of time, the system prohibits the further conversion of funds associated with ticket vouchers to non-cash forms of payment for the designated period of time. On the other hand, if the system determines that the user is below the limit imposed by the system on that user for the designated period of time, the system enables the system to proceed as described herein with the conversion of funds associated with ticket vouchers to non-cash forms of payment. It should be appreciated that such a database of which users redeemed which ticket vouchers for which non-cash forms of payment enables authorities in any future financial fraud investigations or anti-money laundering compliance related tasks.

In certain such embodiments, the system imposes different limits for different users based on whether or not that user is identified by the system. In these embodiments, over the same designated period of time, the system enables an unidentified user to redeem one or more ticket vouchers associated with a first amount of funds for a non-cash form of payment and enables an identified user to redeem one or more ticket vouchers associated with a second, different amount of funds for a non-cash form of payment. For example, the system enables an unregistered anonymous user to redeem one or more ticket vouchers having a total value of $500 or less per day for non-cash forms of payment while the system enables a registered user (whom swipes their player tracking card during the ticket redemption transaction) to redeem one or more ticket vouchers having a total value of up to $4000 per day for non-cash forms of payment. It should be appreciated that for certain types of non-cash forms of payment, such as an original credit transaction in which the user enables the ticket voucher redemption kiosk to read data from the user's credit card or debit card, the ticket voucher redemption kiosk has already identified the user in association with that a transaction such that the system may track the ticket voucher redemption activity of that identified user. It should be further appreciated that to prohibit an unidentified user from repeatedly redeeming ticket vouchers for non-cash forms of payment beyond the limits imposed by the system, in certain embodiments, the system utilizes one or more biometric indicators, such as a facial recognition technologies, to track an unregistered user (by biometric indicators and not by user identification information stored in a gaming establishment patron management system) for anti-money laundering compliance.

In certain other embodiments, the system imposes different limits for different users based on the identity of those users. In these embodiments, the system enables different identified users to redeem one or more ticket vouchers associated with different amounts of funds for a non-cash form of payment over a designated period of time. For example, the system enables an identified user having a first player tracking status to redeem one or more ticket vouchers having a total value of $1000 or less per day for non-cash forms of payment while the system enables an identified user having a second, greater player tracking status to redeem one or more ticket vouchers having a total value of up to $5000 per day for non-cash forms of payment.

It should be appreciated that while described herein as the user utilizing a ticket voucher redemption kiosk to convert an amount of funds associated with a redeemed ticket voucher to a non-cash form of payment, in alternative embodiments, an EGM, a mobile device, and/or a gaming establishment interface, such as a casino desk, are each operable to convert an amount of funds associated with a redeemed ticket voucher to a non-cash form of payment. In these alternative embodiments, certain alternative devices are operable to convert an amount of funds associated with a redeemed ticket voucher to certain types of non-cash forms of payment while other alternative devices are operable to convert an amount of funds associated with a redeemed ticket voucher to any type of non-cash form of payment. For example, while an EGM (such as a slot machine, a video poker machine, a video lottery terminal (VLT), a terminal associated with an electronic table game, a video keno machine, a video bingo machine located on a casino floor, or a sports betting terminal) which is configured to dispense a pre-paid card may convert an amount of funds associated with a redeemed ticket voucher to either a physical pre-paid card or a virtual pre-paid card, a mobile device running a mobile device application may convert an amount of funds associated with a redeemed ticket voucher to a virtual pre-paid card.

Accordingly, in view of the various security concerns (e.g., protecting gaming establishment cash and protecting gaming establishment patrons carrying cash) and labor concerns (e.g., servicing ticket voucher redemption kiosks which dispense cash in exchange for ticket vouchers) associated with cash-based transactions, the system disclosed herein provides an alternative, non-cash-based option for a gaming establishment patron to redeem a ticket voucher while complying with various anti-money laundering regulations which require the tracking of certain financial transactions associated with a gaming establishment patron. As such, to further expand the cashless ecosystem certain gaming establishments strive for, the system disclosed herein enables a user the opportunity to exchange a ticket voucher, in paper form or virtual form, for an amount of funds that are independent of any amount of cash and relatively more secure than an amount of cash.

Obtaining Ticket Vouchers

In various embodiments, prior to redeeming a ticket voucher for an amount of funds associated with a pre-paid card and/or an original credit transaction as described herein, an amount of funds must be converted to one or more ticket vouchers.

In certain embodiments, the system enables an amount of funds deposited in an EGM to be converted to one or more ticket vouchers. In one such embodiment, the system enables a user that has an amount of cash (or other forms of payment as disclosed herein) to utilize an EGM to convert the cash to one or more ticket vouchers via the user first depositing the amount of cash into the EGM and then subsequently cashing out (either pre or post any gaming activity) an amount of a credit balance of the EGM in exchange for a ticket voucher. In another such embodiment, the system enables a user that has one or more printed ticket vouchers to utilize an EGM to convert the printed ticket voucher(s) to a virtual ticket voucher associated with a gaming establishment account maintained for the user. In another such embodiment, the system enables a user that has one or more printed ticket vouchers to utilize an EGM to convert the printed ticket voucher(s) to an anonymous virtual ticket voucher associated with a mobile device.

In certain embodiments, the system enables an amount of funds deposited in a kiosk to be converted to one or more ticket vouchers. In one such embodiment, the system enables a user that has an amount of cash (or other forms of payment as disclosed herein) to utilize a kiosk to convert the cash to one or more ticket vouchers via the user depositing the amount of cash into the kiosk and then subsequently cashing out the deposited amount in exchange for a ticket voucher. In another such embodiment, the system enables a user that has one or more printed ticket vouchers to utilize a kiosk to convert the printed ticket voucher(s) to a virtual ticket voucher associated with a gaming establishment account maintained for the user. In another such embodiment, the system enables a user that has one or more printed ticket vouchers to utilize a kiosk to convert the printed ticket voucher(s) to an anonymous virtual ticket voucher associated with a mobile device.

In certain embodiments, the system enables an amount of funds provided to a gaming establishment interface, such as a casino desk or cage, to be converted to one or more ticket vouchers. In one such embodiment, the system enables a user that has an amount of cash (or other forms of payment as disclosed herein) to utilize a gaming establishment interface to convert the cash to one or more ticket vouchers via the user providing the amount of cash to the gaming establishment interface in exchange for a ticket voucher. In another such embodiment, the system enables a user that has one or more printed ticket vouchers to utilize a gaming establishment interface to convert the printed ticket voucher(s) to a virtual ticket voucher associated with a gaming establishment account maintained for the user. In another such embodiment, the system enables a user that has one or more printed ticket vouchers to utilize a gaming establishment interface to convert the printed ticket voucher(s) to an anonymous virtual ticket voucher associated with a mobile device.

In certain embodiments, the system enables an amount of funds provided to a retail interface, such as a kiosk or cashier at a retail establishment, to be converted to one or more ticket vouchers. In one such embodiment, the system enables a user that has an amount of cash (or other forms of payment as disclosed herein) to utilize a retail interface to convert the cash to one or more ticket vouchers via the user providing the amount of cash to the retail interface in exchange for a ticket voucher.

In certain embodiments, the system enables an amount of funds associated with a gaming establishment account maintained for the user, such as a gaming establishment retail account or a cashless wagering account, to purchase a ticket voucher. In these embodiments, the system enables a user to transfer an amount of funds from a gaming establishment account maintained for the user to a ticket voucher system in exchange for a ticket voucher.

It should be appreciated that in these embodiments wherein funds from one or more sources are potentially used to obtain a ticket voucher, when a user attempts to obtain one or more ticket vouchers, the system determines whether to authorize the exchange of an amount of funds for a ticket voucher. If the system determines not to authorize the exchange of an amount of funds for a ticket voucher, the system communicates a denial to the user and does not cause any ticket vouchers to be issued. On the other hand, if the system determines to authorize the exchange of an amount of funds for a ticket voucher, the system: (i) retains the amount of funds (if, for example, an amount of cash is exchanged at a kiosk for a ticket voucher); (ii) updates a credit balance to reflect the exchange of an amount of funds for a ticket voucher (if, for example, a credit balance of an EGM is being cashed out in exchange for a ticket voucher); and/or (iii) updates an account to reflect the exchange of an amount of funds for a ticket voucher (if, for example, a gaming establishment account associated with the user is exchanged for a ticket voucher). In these embodiments, following the exchange of an amount of funds for a ticket voucher, the system communicates an authorization to the ticket voucher system. Upon receiving data associated with the authorized exchange of an amount of funds for a ticket voucher, the ticket voucher system creates a ticket voucher associated with the exchanged amount of funds and stores data associated with the ticket voucher in one or more databases. Such a created ticket voucher is associated with ticket voucher identification information maintained by the ticket voucher system to identify that ticket voucher for subsequent validation upon a redemption of that ticket voucher. In these embodiments, for each created ticket voucher, the ticket voucher identification information maintained by the ticket voucher system includes one or more of: a date of the ticket voucher issuance, a validation or identification number, such as a ticket number, associated with the ticket voucher, a property address associated with the ticket voucher issuance, an amount of funds associated with the ticket voucher, an expiration date associated with the ticket voucher, an EGM identification associated with the issuance of the ticket voucher, a kiosk identification association with the issuance of the ticket voucher, font or formatting information associated with the ticket voucher, and/or an image of the ticket voucher (e.g., an image of a front of the ticket voucher and/or an image of a back of the ticket voucher).

It should be appreciated that since a created ticket voucher may take multiple forms, the system disclosed herein includes multiple ways to convey such a created ticket voucher to the user. In one embodiment wherein the created ticket voucher takes the form of a paper ticket voucher, the ticket voucher system causes a ticket voucher printer to print the created ticket voucher. In another embodiment wherein the created ticket voucher takes the form of a virtual ticket voucher, the ticket voucher system communicates data to a device associated with the user, such as a mobile device running an application associated with the ticket voucher system, to transfer the created virtual ticket voucher to the user.

Ticket Voucher Redemption Components

It should be further appreciated that the conversion of one or more ticket vouchers to one or more non-cash forms of payment utilizes one or more components of a ticket voucher system, such as a ticket voucher redemption kiosk. Such components of the ticket voucher system include a controller including at least one processor. The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or fund information) via a communication interface of the controller; (2) converting signals read by an interface to a format corresponding to that used by software or memory of the component of the ticket voucher system; (3) accessing memory to configure or reconfigure parameters in the memory according to indicia read from the component of the ticket voucher system; (4) communicating with interfaces and the peripheral devices (such as input/output devices); and/or (5) controlling the peripheral devices. In certain embodiments, one or more components of the controller (such as the at least one processor) reside within a housing of the component of the ticket voucher system, while in other embodiments, at least one component of the controller resides outside of the housing of the component of the ticket voucher system.

The controller also includes at least one memory device, which includes: (1) volatile memory (e.g., RAM which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store software related information (the software related information and the memory may be used to store various files not currently being used and invoked in a configuration or reconfiguration). Any other suitable magnetic, optical, and/or semiconductor memory may operate in conjunction with the component of the ticket voucher system disclosed herein. In certain embodiments, the at least one memory device resides within the housing of the component of the ticket voucher system, while in other embodiments at least one component of the at least one memory device resides outside of the housing of the component of the ticket voucher system. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device is configured to store, for example: (1) configuration software, such as all the parameters and settings on the component of the ticket voucher system; (2) associations between configuration indicia read from a component of the ticket voucher system with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the component of the ticket voucher system to communicate with local and non-local devices using such protocols. In one implementation, the controller communicates with other devices using a serial communication protocol. A few non-limiting examples of serial communication protocols that other devices, such as peripherals (e.g., a bill validator or a ticket printer), may use to communicate with the controller include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the player's computer, partly on the player's computer, as a stand-alone software package, partly on the player's computer and partly on a remote computer or entirely on the remote computer or server. In the latter scenario, the remote computer may be connected to the player's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor of the component of the ticket voucher system to control the component of the ticket voucher system. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a user uses such a removable memory device in a component of the ticket voucher system to implement at least part of the present disclosure. In other embodiments, part or all of the program code and/or the operating data is downloaded to the at least one memory device of the component of the ticket voucher system through any suitable data network described above (such as an Internet or intranet).

The at least one memory device also stores a plurality of device drivers. Examples of different types of device drivers include device drivers for component of the ticket voucher system components and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the component of the ticket voucher system. Non-limiting examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the component of the ticket voucher system loads the new device driver from the at least one memory device to enable communication with the new device. For instance, one type of card reader in the component of the ticket voucher system can be replaced with a second different type of card reader when device drivers for both card readers are stored in the at least one memory device.

In certain embodiments, the software units stored in the at least one memory device can be upgraded as needed. For instance, when the at least one memory device is a hard drive, new parameters, new settings for existing parameters, new settings for new parameters, new device drivers, and new communication protocols can be uploaded to the at least one memory device from the controller or from some other external device. As another example, when the at least one memory device includes a CD/DVD drive including a CD/DVD configured to store options, parameters, and settings, the software stored in the at least one memory device can be upgraded by replacing a first CD/DVD with a second CD/DVD. In yet another example, when the at least one memory device uses flash memory or EPROM units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device also stores authentication and/or validation components configured to authenticate/validate specified component of the ticket voucher system components and/or information, such as hardware components, software components, firmware components, peripheral device components, user input device components, information received from one or more user input devices, information stored in the at least one memory device, etc.

In certain embodiments, the peripheral devices include several device interfaces, such as, but not limited to: (1) at least one output device including at least one display device and at least one pre-paid debit card dispenser; (2) at least one input device (which may include contact and/or non-contact interfaces) including at least one debit card/credit card reader; (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one user/device tracking module; and (14) at least one information filtering module.

Mobile Device Communications

As indicated above, in various embodiments, one or more actions occur between a mobile device and one or more components of the ticket voucher system, via one or more wireless communication protocols between the mobile device and the component of the ticket voucher system. In these embodiments, as described in more detail below, the mobile device application of the mobile device communicates virtual ticket voucher identifying information to the ticket voucher redemption kiosk over one or more wireless communication protocols including, but not limited to: Bluetooth™, Bluetooth™ Low Energy ("BLE"), one or more cellular communication standards (e.g., 3G, 4G, LTE), one or more Wi-Fi compatible standards, and/or one or more short range communication protocols (e.g., a near field communication ("NFC") protocol).

In certain embodiments, the communication with the mobile device can occur through one or more wireless interfaces of the component of the ticket voucher system. In one embodiment, the wireless interface is integrated into the cabinet of the component of the ticket voucher system and the processor of the component of the ticket voucher system is configured to communicate directly with and send control commands to the wireless interface. In another embodiment, the wireless interface is integrated into a device mounted to and/or within the cabinet of the component of the ticket voucher system. In certain embodiments where the wireless interface is embedded in a secondary device, the processor of the component of the ticket voucher system sends control commands to control the wireless interface via a secondary controller.

In certain embodiments which utilize a near field communication ("NFC") implementation, the mobile device application registers a mobile device application with one or more processors of the mobile device. In these embodiments, when the mobile device is detected by an NFC reader of a component of the ticket voucher system, the component of the ticket voucher system communicates one or more data messages to the mobile device (or to one or more servers which then communicate such data messages to the mobile device). Such data messages are commands generated by the component of the ticket voucher system when the mobile device is detected in the NFC reader field. The processor of the mobile device communicates the data message to the mobile device application. The mobile device application responds, such as communicating a triggering message, and a communication channel is opened between the component of the ticket voucher system and the mobile device application (or between the component of the ticket voucher system, one or more servers and the mobile device application). This open communication channel enables the component of the ticket voucher system to send, though the NFC reader, additional data messages to the mobile device (or to the mobile device via one or more servers) which are responded to by the mobile device application of the mobile device. It should be appreciated that as long as the mobile device remains within the NFC field, the component of the ticket voucher system is configured to communicate with the mobile device and send data, such as status updates, as necessary. However, once the mobile device is removed from the NFC field, the communication channel is closed and such status updates must be discontinued.

In other embodiments, the wireless interface implements a Wi-Fi, cellular and/or Bluetooth™ communications protocol to facilitate the communication of data between the mobile device and the component of the ticket voucher system. In such embodiments, Bluetooth™ pairing occurs when two Bluetooth devices agree to communicate with each other and establish a connection. In order to pair two Bluetooth wireless devices, a password (passkey) is exchanged between the two devices. The Passkey is a code shared by both Bluetooth devices, which proves that both users have agreed to pair with each other. After the passkey code is exchanged, an encrypted communication can be set up between the pair devices. In Wi-Fi paring, every pairing can be set up with WPA2 encryption or another type of encryption scheme to keep the transfer private. Wi-Fi Direct is an example of a protocol that can be used to establish point-to-point communications between two Wi-Fi devices. The protocol enables for a Wi-Fi device pair directly with another without having to first join a local network.

It should be appreciated that Wi-Fi, cellular or Bluetooth™ communication protocols can be used in lieu of or in combination with NFC. For instance, an NFC communication can be used to instantiate a Wi-Fi or Bluetooth™ communication between the component of the ticket voucher system, zero, one or more servers and a mobile device, such as secure pairing using one of these protocols. That is, in one embodiment, an NFC interface on a component of the ticket voucher system can be used to set-up a higher speed communication between the component of the ticket voucher system, zero, one or more servers and the NFC enabled mobile device. The higher speed communication rates can be used for expanded content sharing. For instance, a NFC and Bluetooth enabled component of the ticket voucher system can be tapped by an NFC and Bluetooth enabled mobile device for instant Bluetooth pairing between the devices and zero, one or more servers. Instant Bluetooth pairing between a component of the ticket voucher system, an NFC enabled mobile device and zero, one or more servers, can save searching, waiting, and entering codes. In another example, a component of the ticket voucher system can be configured as an NFC enabled router, such as a router supporting a Wi-Fi communication standard. Tapping an NFC enabled mobile device to an NFC enabled and Wi-Fi enabled component of the ticket voucher system can be used to establish a Wi-Fi connection between the devices and zero, one or more servers.

In certain embodiments which implement a Wi-Fi, cellular and/or Bluetooth™ communications protocol, the system utilizes one or more QR codes generated by the component of the ticket voucher system to facilitate the communication of data between the mobile device and the system. In such embodiments, the QR code is used to identify the component of the ticket voucher system that is displaying the QR code to identify the server to which the mobile device should connect. It should be appreciated that the QR code enables the system to establish a secure tunnel or path from the mobile device to the gaming establishment's Wi-Fi network and then to the gaming establishment's wired network and finally to the component of the ticket voucher system. In these embodiments, a communication tunnel wrapper (i.e., a Wi-FiBluetooth™ tunnel wrapper) is utilized to establish a connection between the system and the mobile device and to transport any data messages described herein between the component of the ticket voucher system, zero, one or more servers and the mobile device.

More specifically, in certain embodiments, the user requests, via an input at the component of the ticket voucher system and/or the mobile device, the generation of a QR code by the component of the ticket voucher system. In response to the user's request, the component of the ticket voucher system displays a QR code. In certain embodiments, the QR code includes a nonce which prevents a third-party (e.g., another user) from sniping the user's login attempt. Such an on-demand QR code remains valid for a designated amount of time such that if the user does not scan the QR code within the designated amount of time, another QR code is necessary to be scanned to connect the mobile device to the component of the ticket voucher system.

In these embodiments, the user scans the QR code with the mobile device application. If the system determines that the QR code is valid (i.e., not expired), the mobile device application will connect to the system. It should be appreciated that as long as the established connection between the mobile device and the system remains active, one or more system servers and mobile device may communicate data, such as status updates, as necessary. It should be further appreciated that in association with the Wi-Fi or Bluetooth™ or mobile device network communications protocol described herein, any action requested by the user via the mobile device application does not require a new engagement between the mobile device and the component of the ticket voucher system, such as a new scanning of the QR code to send such a requested action from the mobile device to the component of the ticket voucher system (or to send a requested action from the mobile device to one or more servers and then from one or more servers to the component of the ticket voucher system).

In certain embodiments, following the scanning of a valid QR code, the mobile device application connects to one or more servers. In certain embodiments, after establishing a connection with one or more servers, the mobile device application transmits a connect command to the system. In response to receiving a connect command from the mobile device, the system sends a message to the mobile device. This message serves to encapsulate various commands between the system and the mobile device. In these embodiments, if the mobile device application does not receive this message within a designated period of time, such as within five seconds, the mobile device application displays an error message to the user and directs the user to rescan the QR code.

In addition to the connect command communicated from the mobile device application to the system, the mobile device application of these embodiments is configured to send a disconnect command to the system. Such a disconnect command functions to tear-down the connection the server. It should be appreciated that if the mobile device connection is severed before this command is received by the system, the sever sends this command on behalf of the mobile device application;

In another embodiment, the mobile device application is configured to send a trigger command to the system, such as a component of the ticket voucher system. In this embodiment, the trigger command is associated with an action requested by the user. In such embodiments, when the system receives the trigger command from the mobile device application, the system will communicate the appropriate requests to the mobile device application. If the mobile device application does not receive these requests within a designated amount of time, such as five seconds, the mobile device application will display an error message to the user and enable the user to retry the requested action.

In other embodiments, the mobile device application communicates with the system through a tunnel established over the mobile device's Wi-FI network or the mobile device's network connection. In such embodiments, the mobile device application will connect to one or more system servers which use websockets secured with a transport layer security protocol. The system server operates with one or more translators, similarly using websockets secured with a transport layer security protocol to communicate data to the component of the ticket voucher system.

In certain embodiments which utilize the NFC communication protocol described herein, which utilize the Wi-Fi, cellular and/or Bluetooth™ communication protocols described herein and/or which utilize any other communication protocol described herein, any action requested by the user via the mobile device application requires a new engagement between the mobile device and the component of the ticket voucher system, such as a new tap of the mobile device to designated location(s) of the component of the ticket voucher system. In certain other embodiments which utilize the NFC communication protocol described herein, which utilize the Wi-Fi, cellular and/or Bluetooth™ communication protocols described herein and/or which utilize any other communication protocol described herein, certain actions requested by the user via the mobile device application requires a new engagement between the mobile device and the component of the ticket voucher system, such as a new tap of the mobile device to designated location(s) of the component of the ticket voucher system and other actions requested by the user via the mobile device application do not require any new engagement between the mobile device and the component of the ticket voucher system.

It should be appreciated that while certain data or information pertaining to one or more of the requested actions are communicated between a component of the ticket voucher system and a mobile device, such data or information may additionally or alternatively be communicated: (i) between one or more servers and a mobile device via one or more wireless communication protocols, or (ii) between a component of the ticket voucher system and one or more servers via one or more wireless communication protocols and then from one or more servers to a mobile device via one or more wireless communication protocols.

It should additionally be appreciated that any functionality or process described herein may be implemented via one or more servers, a component of the ticket voucher system, or a mobile device application. For example, while certain data or information described herein is explained as being communicated from a component of the ticket voucher system to a mobile device via one or more wireless communication protocols, such data or information may additionally or alternatively be communicated from one or more servers to a mobile device via one or more wireless communication protocols. Accordingly: (i) while certain functions, features or processes are described herein as being performed by a component of the ticket voucher system, such functions, features or processes may alternatively be performed by one or more servers, or one or more mobile device applications, (ii) while certain functions, features or processes are described herein as being performed by one or more mobile device applications, such functions, features or processes may alternatively be performed by one or more servers, or one or more components of the ticket voucher system, (iii) while certain functions, features or processes are described herein as being performed by one or more servers, such functions, features or processes may alternatively be performed by one or more components of the ticket voucher system, or one or more mobile device applications, and (iv) while certain functions, features or processes are described herein as being performed by one or more components of the ticket voucher system, such functions, features or processes may alternatively be performed by one or more mobile device applications, or one or more servers.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A system comprising:
   a processor; and
   a memory device that stores a plurality of instructions that, when executed by the processor, cause the processor to:
   responsive to an occurrence of a ticket voucher redemption event:
   determine an amount of funds in association with a redemption of the ticket voucher, and
   communicate data that results in a modification, based on the determined amount of funds, of an available balance associated with a debit card.

2. The system of claim 1, wherein the determined amount of funds comprises an amount of funds associated with the ticket voucher less any fees.

3. The system of claim 2, wherein a first amount of fees are associated with a first identified user and a second, different amount of fees are associated with a second, different user.

4. The system of claim 1, wherein the memory device stores a plurality of further instructions that, when executed by the processor responsive to the occurrence of the ticket voucher redemption event, cause the processor to determine the amount of funds in association with the redemption of the ticket voucher responsive to a determination that a debit card limitation on providing funds has not been met.

5. The system of claim 4, wherein a first identified user is associated with a first debit card limitation on providing funds and a second user is associated with a second, different debit card limitation on providing funds.

6. The system of claim 1, wherein the debit card comprises a pre-paid debit card.

7. The system of claim 1, wherein the debit card comprises a physical debit card.

8. The system of claim 1, wherein the ticket voucher comprises a virtual ticket voucher.

9. A system comprising:
   a processor; and
   a memory device that stores a plurality of instructions that, when executed by the processor, cause the processor to:
   responsive to an occurrence of a ticket voucher redemption event:
   determine an amount of funds in association with a redemption of the ticket voucher, and
   communicate data that results in the determined amount of funds to be associated with a credit card.

10. The system of claim 9, wherein the credit card comprises a physical credit card.

11. The system of claim 9, wherein the communicated data is associated with an original credit transaction associated with the credit card.

12. The system of claim 9, wherein the ticket voucher comprises a virtual ticket voucher.

13. A method of operating a system, the method comprising:
    responsive to an occurrence of a ticket voucher redemption event:
    determining, by a processor, an amount of funds in association with a redemption of the ticket voucher, and
    communicating data that results in a modification, based on the determined amount of funds, of an available balance associated with a debit card.

14. The method of claim 13, wherein the determined amount of funds comprises an amount of funds associated with the ticket voucher less any fees.

15. The method of claim 14, wherein a first amount of fees are associated with a first identified user and a second, different amount of fees are associated with a second, different user.

16. The method of claim 13, further comprising, responsive to the occurrence of the ticket voucher redemption event, determining, by the processor, the amount of funds in association with the redemption of the ticket voucher responsive to a determination that a debit card limitation on providing funds has not been met.

17. The method of claim 16, wherein a first identified user is associated with a first debit card limitation on providing funds and a second user is associated with a second, different debit card limitation on providing funds.

18. The method of claim 13, wherein the debit card comprises a pre-paid debit card.

19. The method of claim 13, wherein the debit card comprises a physical debit card.

20. The method of claim 13, wherein the ticket voucher comprises a virtual ticket voucher.

* * * * *